Sept. 15, 1931.   C. H. HAGSTEDT   1,822,887
PIPE COUPLING
Filed Oct. 8, 1929   2 Sheets-Sheet 1

INVENTOR
Charles H Hagstedt.
BY
ATTORNEYS

Sept. 15, 1931. C. H. HAGSTEDT 1,822,887
PIPE COUPLING
Filed Oct. 8, 1929 2 Sheets-Sheet 2
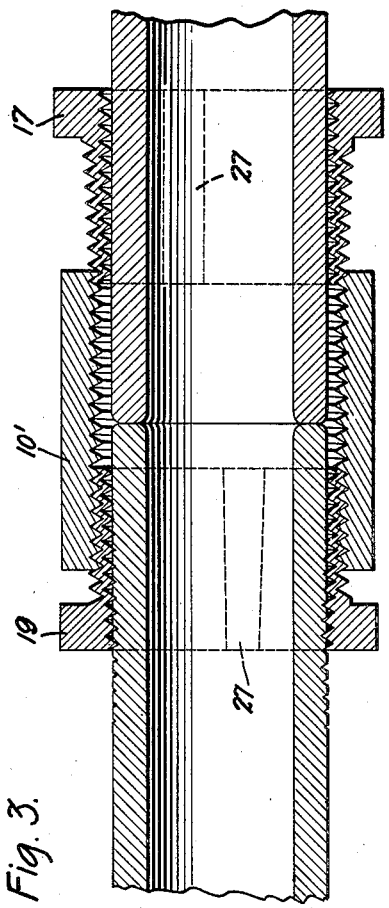
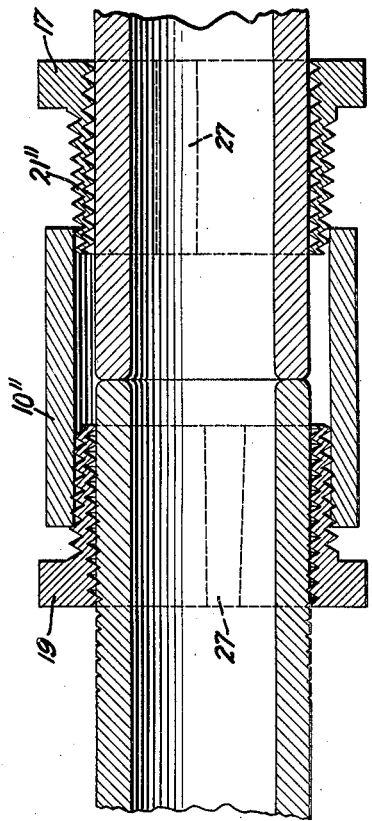
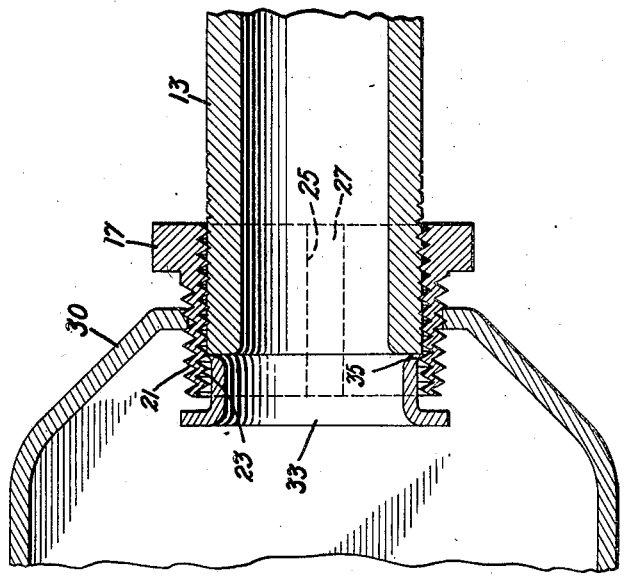
INVENTOR
Charles H. Hagstedt.
BY
ATTORNEYS Patented Sept. 15, 1931

1,822,887

UNITED STATES PATENT OFFICE

CHARLES H. HAGSTEDT, OF VALLEY STREAM, NEW YORK

PIPE COUPLING

Application filed October 8, 1929. Serial No. 398,144.

The present invention relates to couplings for conduits for housing electrical cables and relates to the same general subject matter as my prior Patent No. 1,697,815, of January 1, 1929.

Briefly stated, a conduit of this type should fulfill the following conditions: (1) It must be of fairly smooth interior or otherwise the cable may be damaged while being pulled therethrough, and furthermore, the so-called snake used for this pulling may itself be jammed when it is pushed therethrough. This condition requires that the ends of the pipe sections be in abutting relation and that such ends be free as far as possible of burrs formed in the pipe cutting operation; (2) The conduit be of good electrical conductivity and this requires that the couplings provide not only good physical connection between the pipe sections but good electrical connection as well.

The present invention has for an object the provision of a coupling which will make possible a conduit answering the above specifications while having certain advantages as to simplicity, cheapness, and ease of installation. More specifically it is an object of the invention to provide a coupling which will render the threading of the pipe sections unnecessary prior to assembly, and obviate the use of the usual dies for thread cutting; also by such action to greatly improve the electrical connection between the pipe and the coupling whereby the entire conduit may have a greatly improved electrical conductance. A further object is to provide special means for making, if desired, a damp proof connection and to provide means for electrically connecting, for grounding purposes, a piece of copper wire to such connection or coupling.

With the foregoing and other objects in view, the nature of which will be apparent from the following description, the invention in the preferred form comprises a coupling having either one or a pair of bushings of special construction cooperating with a sleeve. A better understanding of my invention will be had from the following detailed description taken with the annexed drawing, in which:

Figure 3 is a view in longitudinal section of a pipe section having at one end a coupling of slightly modified form and at the other a junction with a junction box; and Figure 4 is a central section of a coupling showing a still further modification.

Figure 1:
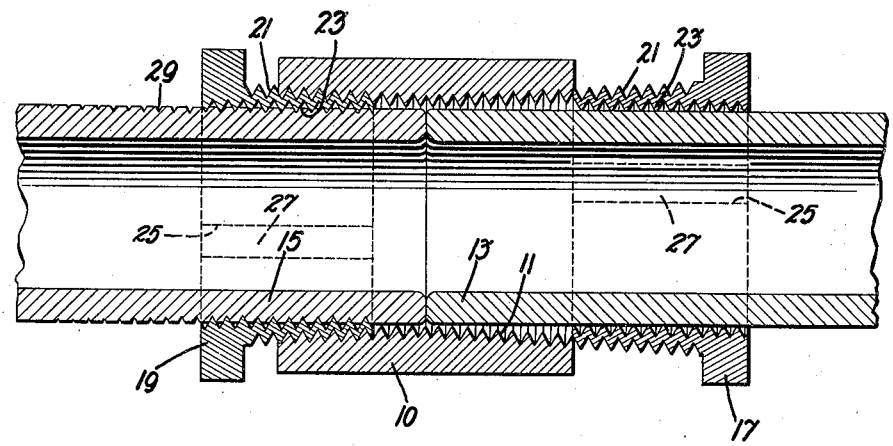
Figure 1 is a view in longitudinal section of an illustrative embodiment of the invention.
Figure 2:
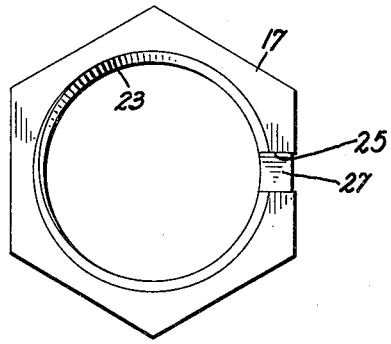
Figure 2 is an end view of the bushing employed.

Referring to the drawings by characters of reference, 10 denotes a sleeve which as seen in Figure 1 is internally threaded as at 11 and which is of a size sufficient to fit over the abutting ends of conduit sections 13 and 15. Cooperating with sleeve 10 are bushings 17 and 19 of similar construction and of relatively hard steel, such bushings being provided with an outer thread 21 and with an internal thread 23 both of the same pitch. Preferably said bushings are split as indicated at 25, Figure 2, and have a tapered exterior as shown.

In assembling the coupling the pipe sections are cut and reamed to provide a smooth bore, the sleeve 10 placed over the abutting ends of said sections and then a bushing, as for example that indicated by 19, is screwed home. Due to the screw threads 23, the metal of which is of the requisite hardness, the bushing acts as a die to cut a shallow thread 29 in the pipe section which has the effect of not only securing the pipe section but also of increasing electrical contact therewith by reason of the fact that it is in contact with a freshly cut surface of the metal, it being understood that as a rule the exterior of the pipe section is provided with a paint or lacquer which is non-conductive. It will be noted that the screw cutting action of the bushing is aided both by the taper of the brushing and by the split therein which provides a sharp cutting edge. It would be possible to omit the taper of the bushing and use a sleeve having a flared interior although this form of construction is not a preferred one.

A further feature of the invention resides in the use of a soft metal plug 27 within the gap 25, such plug, as the bushing is screwed home and the gap contracted, being caused to fit tightly therewithin and form a more or less fluid tight joint. This plug may be of any suitable metal or alloy, as for example lead or copper. The gap 25 also provides an excellent means of attaching a copper wire in electrical relation to the conduit as this metal is of sufficient ductility to accommodate itself to the diminishing size of gap.

A further feature resides in the fact that the threads 23 and 21 of the bushing are arranged so that they are in the same phase, i. e. so that the ridges and valleys of one are directly opposite the respective valleys and ridges of the other. In this manner, greatest strength is obtained for the least amount of metal.

In Figure 1 it will be noted that the interior of sleeve 10 is flared slightly at each end beginning from the middle thereof. The purpose of this is to facilitate the entry of bushings 17 and 19. However, this construction is not absolutely necessary and in Figure 3 I have shown a sleeve 10' which is of straight bore throughout. This form of sleeve is easier and cheaper to construct.

As shown in Figure 4, it is further unnecessary that the sleeve 10" be internally threaded, reliance being placed on the screw thread 21" of the bushings to cut the necessary thread therein. Doing away with the threads of the sleeve further facilitates the manufacture of the latter.

Figure 3 also shows the manner of joining the pipe 13 to an outlet box 30. In this case the pipe is first cut off to the requisite length, a bushing 17 slipped thereover, and the end of the pipe brought slightly within the box and the bushing then screwed so as to be partially wedged between the opening in box 30 and the pipe 13. Before the bushing is screwed tight, an auxiliary bushing 33 is placed within the box and within the end of the bushing. The bushing 17 is then screwed tight, thereby cutting threads not only in the pipe 13 but within the portion of the outlet box 30 in contact therewith. Preferably the auxiliary bushing 33 is not screw threaded but has a slightly expanded portion or rim 35 of slightly increased diameter which causes it to snugly engage the threads of the bushing 17. The purpose of this auxiliary bushing is to provide a smooth outlet for the wires, it being noted that this bushing will be held snugly in place due to the contact of the bushing pressing thereagainst. For this reason it is made of a thinner wall than the pipe and thus does not weaken the grip of the bushing on the pipe nor hinder its thread cutting action thereon.

The advantages of my improved construction are believed to be evident from the foregoing but may be briefly capitulated here. It will be seen that in the first place, the use of die and stock is rendered unnecessary. This is of particular advantage in the cases where one pipe section, for example, is in a position which is difficult of access, and which in such position could not be threaded by means of a die. In such a case where the die was used, it was necessary to remove the pipe section. In the second place, an improved electrical contact is obtained, a matter which is regarded of great importance by fire underwriting associations. Thirdly, by means of the construction shown, exact alignment of the pipe sections need not take place since the threads are cut in situ. Fourthly, due to the fact that bushings are of varying diameter, irregularities in the diameter of the pipe sections (which commonly occur) are immaterial, whereas in the case where sleeve and pipe end are threaded to one another, such variation may prevent a tight fit.

It will be understood that while particularly adapted for piping to house electrical conduits, my invention is applicable to other forms of piping. I wish it particularly understood that my device is adapted to connect a pipe section to fittings of various forms other than the one illustrated.

I claim:

1. A split bushing of the character described of hardened metal, having a tapered exterior and internal and external screw threads of the same pitch and adapted to connect a pipe section to another pipe section or fitting, said screw threads being adapted to cut cooperating threads in the members which they secure.

2. In combination with a sleeve member and a pipe member, a split bushing of hardened metal adapted to extend between the sleeve and pipe members and having internal and external screw threads of the same pitch, the exterior of the bushing being tapered toward the end thereof, whereby when forced between said members, said bushing will bind them together aided by the screw threads cut in said members by said bushing.

3. In combination with a sleeve member and a pipe member, a split bushing of hardened metal adapted to extend between the sleeve and pipe members and having internal and external screw threads of the same pitch and of substantially the same depth, such threads being of the same phase whereby the ridges and valleys of an internal thread are opposite the respective valleys and ridges of an external thread, whereby when forced between said members, said bushing will bind them together aided by the screw threads cut in said members by said bushing.

4. In a coupling, a fitting, a pipe section, a tapered, flanged, split bushing of hardened metal and having internal and external screw threads of the same pitch, said bushing extending over the end of said pipe section and extending into an aperture of the fitting, an auxiliary bushing having walls which are more easily deformable than the pipe section and extending from beyond the end of said bushing remote from said flange to within said end, the construction being such that when said bushing is screwed home it binds said auxiliary bushing in place within said fitting.

5. In combination with a sleeve member and a pipe member, a split bushing of hardened metal adapted to extend between the sleeve and pipe members and having internal and external screw threads of the same pitch, the exterior of the bushing being tapered toward the end thereof and the interior of said bushing being straight, whereby when forced between said members, said bushing will bind them together aided by the screw threads cut in said members by said bushing.

In testimony whereof I have affixed my signature to this specification.

CHARLES H. HAGSTEDT.